United States Patent
Wakamoto et al.

(10) Patent No.: US 8,695,871 B2
(45) Date of Patent: Apr. 15, 2014

(54) INFORMATION DISPLAY PANEL

(75) Inventors: Masahiko Wakamoto, Saitama (JP);
Masatoshi Fujita, Saitama (JP)

(73) Assignee: Mobile Business Promote Co., Ltd., Fukuoka (JP)

( * ) Notice: Subject to any disclaimer, the term of this patent is extended or adjusted under 35 U.S.C. 154(b) by 140 days.

(21) Appl. No.: 12/675,407

(22) PCT Filed: Aug. 29, 2008

(86) PCT No.: PCT/JP2008/002356
§ 371 (c)(1),
(2), (4) Date: Jun. 7, 2010

(87) PCT Pub. No.: WO2009/028203
PCT Pub. Date: Mar. 5, 2009

(65) Prior Publication Data
US 2010/0282835 A1     Nov. 11, 2010

(30) Foreign Application Priority Data

| Aug. 30, 2007 | (JP) | 2007-007510 U |
| Sep. 21, 2007 | (JP) | 2007-274430 |
| Oct. 6, 2007 | (JP) | 2007-008500 U |
| Oct. 12, 2007 | (JP) | 2007-291296 |
| Jan. 26, 2008 | (JP) | 2008-000985 U |
| Apr. 16, 2008 | (JP) | 2008-003195 U |

(51) Int. Cl.
*G06F 17/00*     (2006.01)
(52) U.S. Cl.
USPC ............................ 235/375; 235/380; 235/454
(58) Field of Classification Search
USPC ......... 235/375, 379, 380, 449, 435, 436, 439, 235/441, 444, 454, 451
See application file for complete search history.

(56) References Cited

U.S. PATENT DOCUMENTS

| 6,908,036 | B2 * | 6/2005 | Koshimizu et al. | 235/492 |
| 2002/0118099 | A1 * | 8/2002 | Oda et al. | 340/10.52 |
| 2007/0008140 | A1 * | 1/2007 | Saarisalo et al. | 340/572.7 |
| 2008/0030300 | A1 * | 2/2008 | Naito et al. | 340/5.1 |

FOREIGN PATENT DOCUMENTS

| JP | 2003076920 A | 3/2003 |
| JP | 2003331212 A | 11/2003 |
| JP | 2004152076 A | 5/2004 |
| JP | 2006011422 A | 1/2006 |

(Continued)

OTHER PUBLICATIONS

Decision to Grant a Patent from JP 2009-103597 and English translation thereof (Feb. 2, 2010).

(Continued)

*Primary Examiner* — Michael G Lee
*Assistant Examiner* — Tabitha Chedekel
(74) *Attorney, Agent, or Firm* — Porzio, Bromberg & Newman, P.C.

(57) ABSTRACT

In an information display panel, an illuminating device 3 for illuminating an information medium from a back face is provided on the back face of the information medium, while a reader/writer 4 corresponding to a non-contact information storage medium is provided on the back face side of the illuminating device 3. The reader/writer can be concealed by illuminating the information medium by the illuminating device 3. As a result, an information display panel capable of both bright information display and radio communication in a short distance can be obtained without undermining designability.

21 Claims, 15 Drawing Sheets

(56) References Cited

FOREIGN PATENT DOCUMENTS

| | | |
|---|---|---|
| JP | 2006030882 A | 2/2006 |
| JP | 2006135037 A | 5/2006 |
| JP | 3126054 U | 10/2006 |
| JP | 2006349887 A | 12/2006 |
| JP | 2007171253 A | 7/2007 |
| JP | 3139978 U | 2/2008 |

OTHER PUBLICATIONS

Extended European Search Report for corresponding European Application No. 08790510.5.

* cited by examiner

INFORMATION DISPLAY PANEL

CROSS REFERENCE TO RELATED APPLICATION

This is a National Stage of International Application No. PCT/ JP2008/002356, filed Aug. 29, 2008, which claims the benefit of Application No. 2007-007510 U filed Aug. 30, 2007 in Japan; 2007-274430 filed Sep. 21, 2009 in Japan; 2007-008500 U filed Oct. 6, 2007 in Japan; 2007-291296 filed Oct. 12, 2007 in Japan; 2008-000985 U filed Jan. 26, 2008 in Japan and 2008-003195 U filed Apr. 16, 2008 in Japan, the disclosures of which Applications are incorporated by reference herein.

BACKGROUND OF THE INVENTION

1. Field of the Invention

The present invention relates to an information display panel capable of interactive communication only by holding a non-contact information storage medium (hereinafter also referred to as an "RFID tag") incorporated in a portable information terminal or a card (IC card) with non-contact information recording medium over an access point of the information display panel in which a reader/writer for the RFID (Radio Frequency Identification) is provided and from which contents such as music, games, novels, movies and the like, area information such as accommodations of tourist spots, events, shopping, sports events and the like can be obtained instantaneously.

2. Description of the Related Art

As an information display panel in a mode in which information is transmitted/received in an interactive manner with an RFID tag or a reader/writer installed on a back face of the poster by holding a portable information terminal incorporating an RFID tag constituted by an IC tag over a poster, Patent Document 1: Japanese Patent Laid-Open No. 2002-185565, Patent Document 2: Japanese Patent Laid-Open No. 2006-31531, Patent Document 3: Japanese Patent Laid-Open No. 2007-34362 and the like are known, for example.

However, in the information display panel described in the above Patent Documents 1 to 3, since an IC tag is buried in the poster itself to become an information display screen (hereinafter also referred to as an "advertising medium" or "advertisement") or the IC tag or a reader/writer is installed on the back face side, there is a problem that the panel itself cannot be displayed brightly at night or the like.

Thus, though it is not known yet at the time of filing of this application, according to examination of the inventors of the present invention, as shown in FIG. 18, a direct light source 02 such as an LED, a fluorescent lamp and the like may be arranged on the back face of an advertising medium 01 and a reader/writer 03 may be inserted between them. However, a shade 04 of the reader/writer 03 is generated on the advertising medium 02 by light emitted by the direct light source 02, and designability of the advertising medium is lost, which is a problem.

There is also a problem that if metal such as a reinforcing steel as a construction material is present in the periphery of an installed spot of the prior-art information display panel, radio interference or drop in an antenna output of the reader/writer can easily occur.

There is also a problem that, in the prior-art information display panel, when a poster is taken out of the panel and replaced, it is difficult to adjust the position of the reader/writer according to an access point of a new poster or to update information offered by the reader/writer.

Also, if the information display panel is to be used for the purpose of billing for contents purchase, trouble should be avoided that inadvertent charging is made only by bringing the portable information terminal close to the information display panel by accident.

The present invention was made in view of the above problems and has an object to provide an information display panel in which designability of an advertising medium or information display panel is not lost, communication failure does not occur, an attachment position of the reader/writer can be changed easily and efficiently according to a new access point in replacement of a poster, drop in the antenna output caused by radio interference can be avoided, data can be updated in a lump sum, and billing trouble will not occur.

SUMMARY OF THE INVENTION

In order to solve the above problems, following devices are provided in the present invention.

That is, the present invention is an information display panel characterized in that an illuminating device illuminating an information medium from a back face is provided on the back face of the information medium, while a reader/writer corresponding to a non-contact information storage medium is provided on the back face side of the illuminating device.

The information media include an advertising medium, an evacuation sign, an information sign and the like. The non-contact information storage media include an RFID tag, an IC card and the like. They may be either passive tags or active tags. An information transmission method between the non-contact information storage medium and the reader/writer is bidirectional transmission of signals between antenna portions of the both and includes an electromagnetic induction method and a radio wave method. Also, the information medium and the illuminating device may be separate or the information medium may be directly printed on the surface of the illuminating device.

According to the above device, since the reader/writer is not arranged between the information medium and the illuminating device but mounted on the back face side of the illuminating device, even if the illuminating device emits light, the shade of the reader/writer is not reflected on the information medium. As a result, an information display panel with illumination having excellent appearance can be obtained.

In the present invention, the illuminating device is provided with a planar light source emitting light to the information medium side in a planar state.

By having the illuminating device as a planar light source as above, brightness variation is not caused even if the information medium and the illuminating device are brought into close contact with each other, and an information display panel with higher designability can be obtained.

In the present invention, the illuminating device is provided with a light guide plate of an edge light type or a light emitting plate in an electroluminescence (EL) method arranged on the back face of the information medium and is characterized in that the information medium is brought into close contact with the illuminating device.

In the case of the illuminating device as a direct light source in which an LED or a fluorescent lamp is arranged immediately below the information medium, if the illuminating device is brought into close contact with the information medium, presence of the LED or fluorescent lamp is vaguely reflected on the information medium. Also, the LED and the fluorescent lamp can easily obstruct communication between the non-contact information storage medium and the reader/writer. Thus, in the case of the light guide plate of the edge light type as in the present invention, since the light source is not arranged on the back face of the information medium, information failure hardly occurs. At the same time, since the light guide plate is planar light-emitting, brightness variation does not occur even if it is brought into close contact with the information medium. Similarly, in the case of the EL method, since the EL itself emits planar light, brightness variation hardly occurs, and also, since the EL itself can be configured in a thin structure, communication failure hardly occurs.

In the present invention, the non-contact information storage medium is an RFID tag and that is incorporated in a portable information terminal or a card (IC card).

By configuring as above, only by holding a portable information terminal such as mobile phone or a card carried on a daily basis, various kinds of information can be obtained.

In the present invention, a plurality of the reader/writers are attached to the back face of the illuminating device in accordance with plural different locations of the information medium.

According to the above device, even if the plurality of reader/writers are mounted on the back face of the illuminating device, no shade is reflected on the advertising medium from each reader/writer. Also, a large quantity of information can be obtained from a single information display panel.

In the present invention, in the plurality of reader/writers, an antenna portion and a control portion are formed separately, and the single control portion is shared by the plurality of reader/writers, and the plurality of antenna portions are attached to plural different locations of the information medium.

According to the above device, by connecting the plurality of antenna portions to the single control portion with lead wires, the plurality of reader/writers can be configured. As a result, since each reader/writer is reduced in size, many access points of the information medium can be set, and a degree of freedom in advertisement design can be increased. Also, as compared with the control portion, the antenna portion can be constituted in a thin type, and by containing the shared control portion around a peripheral frame, the information display panel can be constituted in a thin type. Also, even if the number of access points is increased, it can be coped only with an increase in the antenna portions, which can simplify a circuit configuration around the reader/writer and lead to inexpensive manufacture.

In the present invention, the reader/writer is disposed movably in the planar direction on the back face side of the illuminating device.

By configuring as above, when the access point of the information medium is to be changed, the location of the reader/writer can be freely changed, and a degree of freedom in designing the information medium can be improved.

In the present invention, a guide for movably holding the reader/writer is provided on the back face side of the illuminating device, and the reader/writer is positioned and fixed by moving on the guide.

According to the above device, even if the position of the access point provided on the information medium is changed during a replacement work of the information medium, the reader/writer can be moved to a position corresponding to a new access point along the guide. As a result, the information medium manufacturer can set the access point at an arbitrary position without any restriction.

In the present invention, the guide is disposed movably on the back face side of the illuminating device. By making the guide itself movable as above, a movable range of the reader/writer can be further extended.

In the present invention, the above guides are provided in plural, and the reader/writer is held by each of the guides. By configuring as above, the plurality of reader/writers can be moved, respectively.

In the present invention, the guide is provided with an X-axis guide moving in the X-axis direction and a Y-axis guide arranged orthogonally to the X-axis guide and moving in the Y-axis direction, and the reader/writer is attached at an intersection portion of the X-axis guide and the Y-axis guide.

According to the above device, the reader/writer can be moved and controlled by the X-axis guide and the Y-axis guide vertically and horizontally according to a position of the access point to be changed. As a result, by moving only the X-axis guide and the Y-axis guide from outside the information display panel, the reader/writer can be freely moved in the X-Y direction.

In the present invention, the reader/writer has a coil-shaped antenna coil for radio communication with the non-contact information storage medium, and the antenna coil is sandwiched by a conductive layer portion made of a metal plate or the like and a magnetic sheet.

According to the above device, even in an environment where metal or the like is arranged around a spot in which the information display panel is installed, sensitivity of the reader/writer is improved and becomes rarely subjected to the environment. As a result, only by holding the portable information terminal or the IC card by a user, service can be used by utilizing digital contents.

In the present invention, on the back face side of the illuminating device, a back face plate is arranged with an interval of 3 mm or more, the reader/writer is disposed on the back face of the illuminating device, and a magnetic sheet is disposed at a portion on the back face plate opposing the reader/writer.

According to the above, if a frequency of an electromagnetic wave for radio communication with a non-contact information storage medium is 13.56 MHz, for example, since the magnetic sheet is provided at an opposing position of the antenna coil, receiving intensity of the portable information terminal and sensitivity of the reader/writer can be improved similarly to the above.

In the present invention, the back face of the illuminating device and the reader/writer have planar fasteners for connection, respectively, by which the reader/writer is fixed to the back face of the illuminating device.

According to the above means, since the reader/writer can be detachably attached to the illuminating device through the planar fastener, in replacement with an advertising medium with a different access point, the reader/writer can be attached easily corresponding to the access point with adjustment. As a result, a favorable communication state can be ensured, and an advertisement producer can produce an advertising medium with excellent design in which an access point is freely disposed.

In the present invention, the illuminating device is provided with a light guide plate of an edge light type and a light reflective plate arranged on the back face side of the light guide plate, and the planar fastener for connection is disposed on the back face side of the light reflective plate.

According to the above means, the reader/writer can be detachably attached to the back face of the light reflective plate. As a result, even if the reader/writer is fixed to the illuminating device, light is emitted to the information medium side by the reflective plate, and deterioration in illumination capability can be prevented.

In the present invention, a back face plate is arranged on the back face side of the illuminating device, and on the back face plate and the reader/writer, the planar fastener for connection is disposed, respectively, And by the planar fastener for connection, the reader/writer is fixed to a front face of the back face plate.

According to the above means, an attaching position of the reader/writer can be easily adjusted according to the advertising medium having a different access point for each design.

In the present invention, an IC tag for information update in which update data to be transmitted from the reader/writer to the non-contact information storage medium is stored is further provided, and when the IC tag for information update is held over the reader/writer, the update data is read by the reader/writer.

According to the above means, the IC tag for information update is usually held by a replacement worker of the information medium. In a replacement work, by holding the IC tag for information update over the reader/writer, information to be transmitted to the non-contact information storage medium can be automatically updated.

In the present invention, the IC tag for information update is disposed in the information medium, and when the information medium is installed in the illuminating device, the update data is automatically read by the reader/writer installed at a position corresponding to the IC tag for information update.

According to the above means, when the information medium is to be replaced, the update data is automatically transmitted/received between the IC tag for information update and the reader/writer, and data in an old link destination or the like (URL or the like) can be updated to new data in a lump sum, and efficiency of the replacement work of the information medium can be improved.

In the present invention, the reader/writer is provided with an information update portion performing polling by a protocol exclusively for information update for communication with the IC tag for information update.

With such configuration, since information update can be performed only between the IC tag for information update and a specific reader/writer, alteration of delivered information by an outsider can be prevented. This information update portion is generally disposed in a control portion in the reader/writer.

In the present invention, a billing control portion is provided having a touch determination portion for detecting whether or not the non-contact information storage medium is held over any one of the plurality of reader/writers, a purchase ID issuing portion for transmitting a purchase ID for contents purchase to the non-contact information storage medium when the non-contact information storage medium is held over the reader/writer, a polling start portion for starting polling of the reader/writer for purchase confirmation when the non-contact information storage medium is held over the reader/writer, and a purchase ID comparison portion that obtains the purchase ID from the non-contact information storage medium when the non-contact information storage medium is held over the reader/writer for purchase confirmation and determines if it is issued by the purchase ID issuing portion and permits billing of the contents purchase.

According to the above means, if contents are to be purchased, authorization is made in advance by the purchase ID provided to the non-contact information storage medium, billing can be made after a purchase intention of the purchaser is confirmed. Also, in usual time, since the reader/writer for purchase confirmation is stopped, such a situation that a user holding the non-contact information storage medium in a pocket leans against the information display panel and is advertently charged can be prevented.

In the present invention, the billing control portion is further provided with a steady polling portion for having the plurality of reader/writers perform polling steadily, a contents trial portion for transmitting information for obtaining contents for a trial use to the non-contact information storage medium when the non-contact information storage medium is held over the reader/writer, and a timer portion for monitoring a polling time of the reader/writer for purchase confirmation by the polling start portion.

With the above configuration, a user can use the contents on a trial basis before purchase. Also, since the polling (waiting for receiving) time of the reader/writer for purchase confirmation can be monitored in conjunction with the trial use, the reader/writer for purchase confirmation can stand by in a flexible manner according to the trial contents.

In the present invention, a communication area supplying device provided with a radio communication antenna and connected to a public communication network such as a telephone line, the Internet and the like and supplying a communication area and a WEB server device connected to the communication area supplying device and receiving an access from the outside and delivering information are provided, and on the basis of communication between the portable information terminal incorporating the non-contact information storage medium and the reader/writer, the portable information terminal can make an access to the WEB server device through the communication area supplying device.

With the above configuration, the portable information terminal can directly download necessary information via radio communication with the information display device. As a result, the device can be used for information delivery in emergency or the like.

According to the information display panel of the present invention, a shade of the reader/writer is not reflected in the advertising medium. This information display panel can ensure favorable communication performance with the portable information terminal and the IC card all the time, and in replacement of the advertising medium, arrangement of the reader/writer can be easily adjusted and changed according to the access point of a new advertising medium. As a result, the advertizing medium can be freely designed without being restricted by the arrangement of the reader/writer. In replacement of the advertizing medium, data at the link destination can be updated in a lump sum, and efficiency of the replacing work can be improved.

DETAILED DESCRIPTION OF THE PREFERRED EMBODIMENTS

Figure 1:
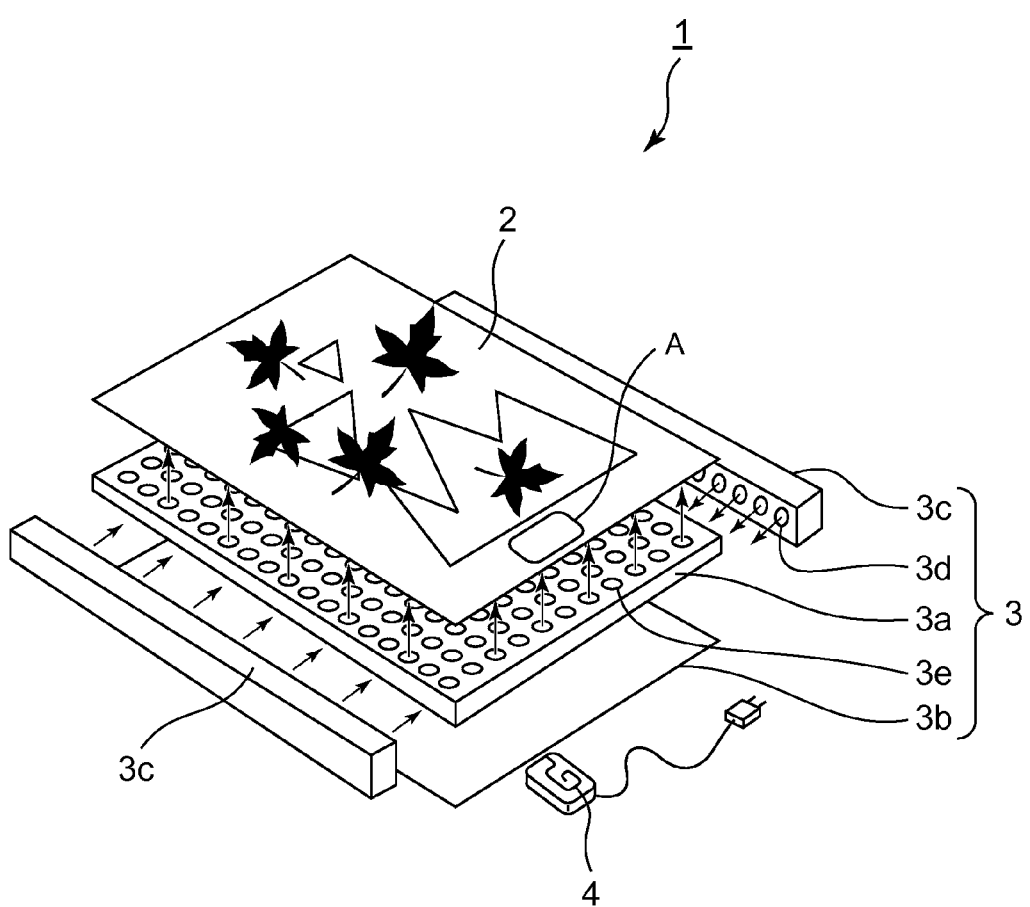
FIG. 1 is an appearance perspective view of an essential part of an electronic signboard shown in an exploded manner according to a first embodiment of the present invention.

Preferred embodiments for carrying out the present invention will be described below referring to the attached drawings. In the drawings illustrating each of the embodiments, the same reference numerals are given to equal members or equal portions. Also, in the embodiment, an advertizing medium, which is one type of information media, refers to those in a mode in which an access point indicating a point over which the portable information terminal is to be held and advertisements are printed on a sheet material such as paper or a synthetic resin material. However, the advertising medium in this embodiment refers to those in which a thin transparent sheet material is brought into close contact with the back face (rear face) of the sheet material in some cases.

Figure 2:
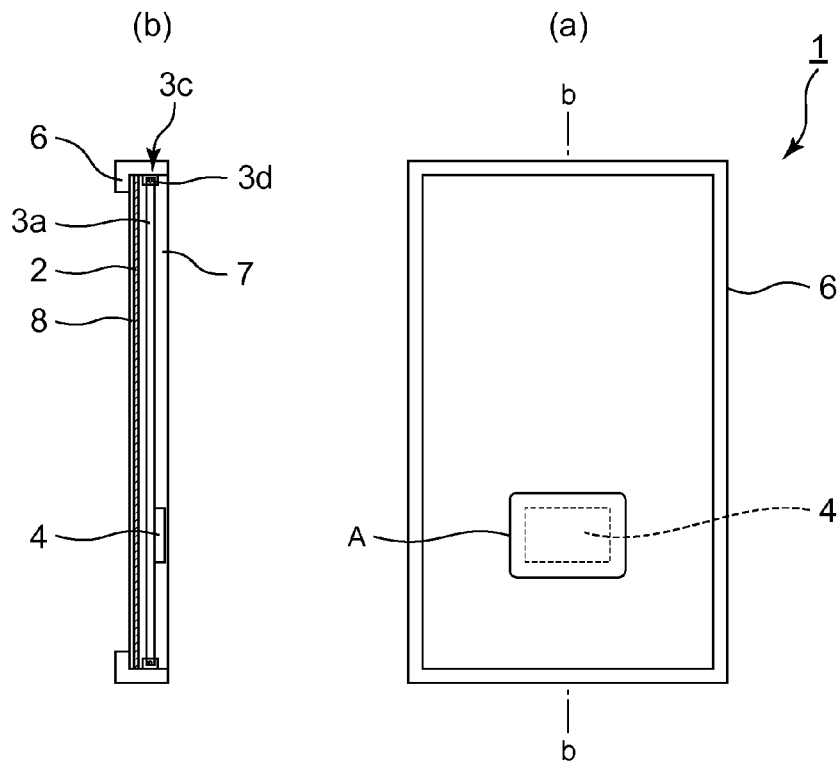
FIG. 2A is a front view of the electronic signboard and FIG. 2B is a sectional view in b-b line in FIG. 2A.

In a first embodiment, as shown in FIGS. 1 and 2, an information display panel of the present invention is applied to an electronic signboard 1 of an edge light type. This electronic signboard 1 is provided with an advertising medium (advertisement panel) 2, an illuminating device 3 of a planar light emission type disposed on a back face of the advertising medium for illuminating the advertising medium 2 from the back face, and a reader/writer 4 for RFID for reading/writing information via radio communication from an RFID tag or an IC tag, which is a non-contact information storage medium of a portable information terminal.

The electronic signboard 1 will be described more specifically. The electronic signboard 1 is configured by a light transmissive light guide plate 3a attached to the back face of the advertisement panel 2, a reflective plate 3b attached to the back face of the light guide plate 3a and having a light reflection function, and a light source unit 3c arranged along both edges of the light guide plate 3a and the reflective plate 3b.

In the light source unit 3c, a large number of LEDs 3d connected to a power source, not shown, for lighting are buried opposing an end face of the light guide plate 3a. The reader/writer 4 is attached to the back face on the side opposite the light guide plate 3a with respect to the reflective plate 3b. The reader/writer 4 is attached at a position corresponding to an access point A printed on the advertising medium 2. The access point A is a mark for non-contact communication between the portable information terminal incorporating the RFID tag or the like and the reader/writer 4.

In the entire surface of the light guide plate 3a, a large number of small lens portions 3e having a light collecting function are formed, by which light from the LED 3d can evenly illuminate the advertising medium 2 from the back face without variation. Here, a lens-type light guide plate is shown, but the present invention is not limited to that, and it is needless to say that a light guide plate in which a V-shaped cut groove is formed by laser or machine or the like can also be used.

The reader/writer 4 has, not particularly shown here, an antenna portion mounted on an antenna board and a control portion controlling the antenna portion and storing information to be transmitted/received with the portable information terminal.

Over the access point A, the portable information terminal or the IC card is held for conducting communication with the reader/writer 4. The RFID tag, which is a non-contact information storage medium incorporated in the portable information terminal, may be a passive tag, which does not have to incorporate a battery or may be an active tag in a mode incorporating a battery and emitting a radio wave. This applies not only to the first embodiment but also to each of the embodiments and variations shown below. If the RFID tag or the IC tag is an active tag, the reader/writer 4 side can be made a passive tag.

Also, an information transmission method between the reader/writer 4 and the non-contact information recording medium is to bidirectionally transmit a signal between antenna portions of the both, and it is needless to say that the method may be either of an electromagnetic induction method or a radio wave method. This applies not only to the first embodiment but also to each of the embodiments shown below.

Arrows in FIG. 1 indicate a direction of light emitted from the LED 3d, and reference numeral 6 in FIG. 2 denotes a frame holding an edge of the illuminating device 3, reference numeral 7 for a protective plate for protecting the reflective plate 3b, and reference numeral 8 for a transparent protective plate for protecting the advertising medium 2, respectively.

According to the electronic signboard 1 of the first embodiment, light irradiated from the LED 3d, which is a light source of the edge light type, enters from an end face of the light guide plate 3a and then, is transmitted through the light guide plate 3a and irradiates the advertising medium 2 through the lens portion 3e from the back face. Thus, even if the light guide plate 3a is attached to the back face of the advertising medium 2 in close contact, unevenness in light is not generated on the surface of the advertising medium 2.

Also, since a distance from the advertising medium 2 to the reader/writer 4 can be made extremely short, information reading or writing can be performed smoothly in communication conducted between the RFID tag of the portable information terminal or the IC card and the reader/writer 4.

The light guide plate 3a is a planar light emission type emitting light to the advertising medium 2 side. As a result, since a silhouette of the reader/writer 4 arranged on the back face side of the light guide plate 3a is fully concealed day and night, designability of the advertising medium 2 is not lost.

Moreover, in the electronic signboard 1, since the reflective plate 3b is disposed on the back face side of the light guide plate 3a and the reader/writer 4 is attached to the back face side of the reflective plate 3b, reflection of a silhouette (shade) of the reader/writer 4 in the advertising medium 2 can be further avoided. Also, since brightness of the light guide plate 3a is increased by the reflective plate 3b, the electronic signboard 1 which can give stimulation to users such as pedestrians and the like and has favorable visibility and high advertising effects with impact can be obtained.

Figure 3:
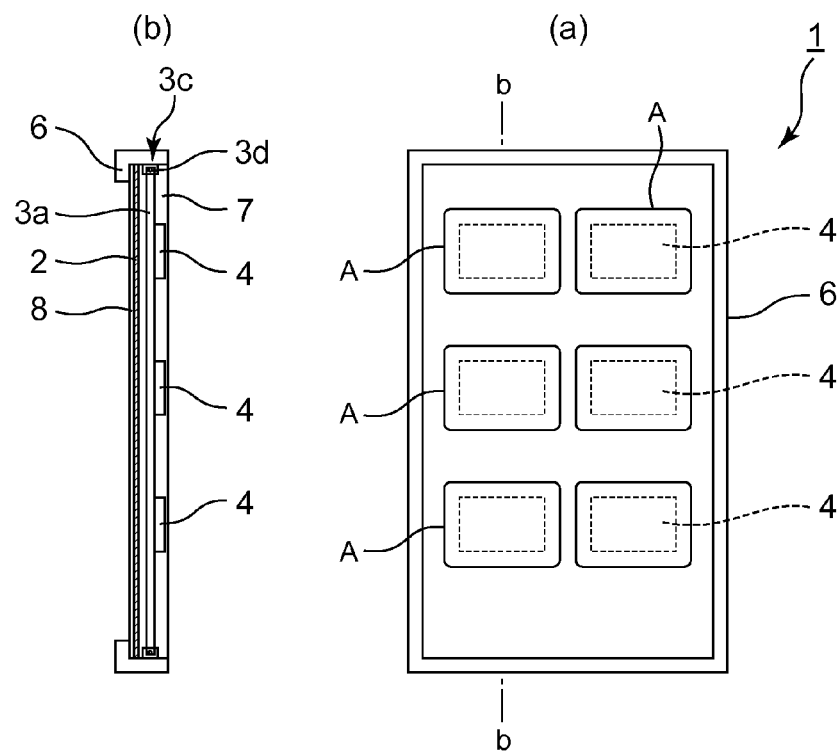
FIG. 3A is a front view of an electronic signboard and FIG. 3B is a sectional view of b-b line in FIG. 3A according to a first variation of the first embodiment.

In the above first embodiment, the case was described in which a single unit of the reader/writer 4 in which an IC chip capable of information reading and writing with the antenna portion is integrally formed is provided, but as shown in a first variation shown in FIG. 3, it can also be so configured that a plurality of (six in this variation) reader/writers 4 with the same structure as in the first embodiment are attached independently. These reader/writers 4 store URL or the like such as goods information for goods purchase, points such as maps, area information and the like in each reader/writer.

According to the first variation, by holding the portable information terminal or the like over the access point where the reader/writer 4 is disposed, information desired by a user can be obtained.

Figure 4:
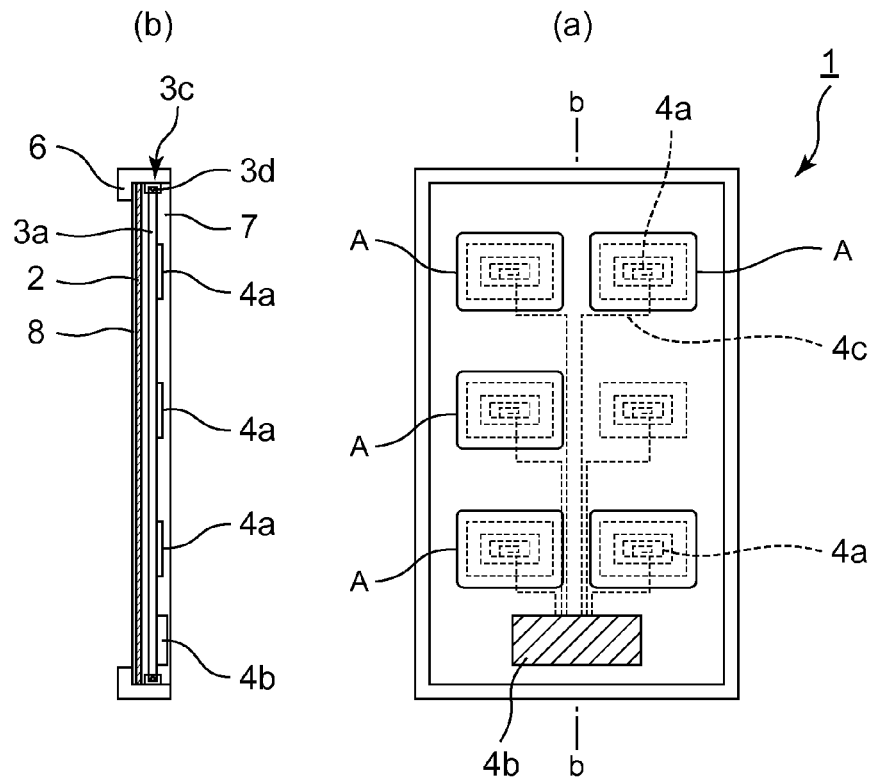
FIG. 4A is a front view of an electronic signboard and FIG. 4B is a sectional view of b-b line in FIG. 4A according to a second variation of the first embodiment.
Figure 5:
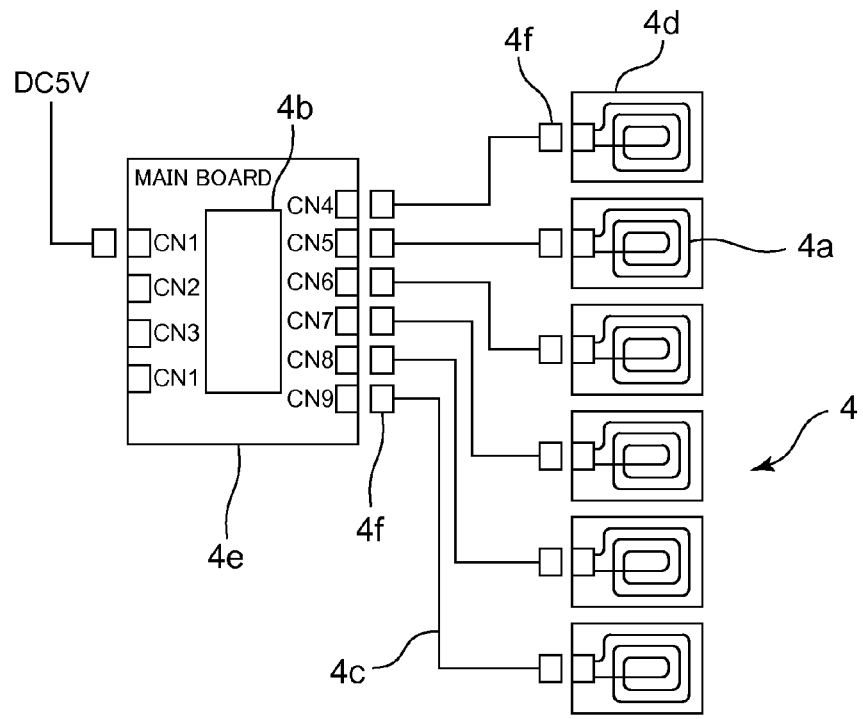
FIG. 5 is a circuit configuration diagram in the second variation.

Also, in the first variation, each of the reader/writers 4 is disposed independently, but instead, they can be configured as in a second variation in FIGS. 4 and 5. That is, the reader/writer 4 is separated to an antenna portion 4a and a control portion 4b having a memory portion including an MPU, the coil-shaped antenna portion 4a is mounted on an antenna board 4d and the control portion 4b is mounted on a main board 4e, respectively, so as to make them common to all the reader/writers. The antenna portion 4a is connected to the control portion 4b by a lead wire 4c. The main board 4e has a rectangular shape with a lateral width dimension of 30 mm and a longitudinal width dimension of 100 mm, on which electric elements such as a buzzer, a multiplexer, a power-supply regulator and the like are mounted in addition to the MPU. The antenna portion 4a has a rectangular shape with a lateral width of 60 mm and a longitudinal width of 80 mm.

On the control portion 4b, a storage portion (memory) is mounted for storing information to be transmitted to the portable information terminal or storing an ID of the portable information terminal held over, for example. Reference symbol 4f in FIG. 5 denotes a connecter terminal.

The reader/writer 4 in this second variation is particularly provided with a plurality of (five, here) antenna portions 4a, and each of the five antenna portions 4a is connected to the single control portion 4b through the lead wire 4c.

According to the second variation, since the reader/writer 4 can be configured by connecting a plurality of the antenna portions 4a to the single control portion 4b, similarly to the first variation, reading and writing signals of different information can be transmitted/received in each of the antenna portions 4a. Also, a degree of freedom in production of advertisement design is increased, and since the circuit configuration around the reader/writer 4 can be designed in a simple manner, the inexpensive electronic signboard 1 can be manufactured, which is an advantage. Moreover, since the antenna portion 4a can be configured in a thin structure, the electronic signboard can be thinned.

In the above first embodiment, the first variation, and the second variation, the case in which the edge-light type light guide plate 3a is provided was explained as an example, but it is needless to say that the present invention is not limited to that. An illuminating device with planar light emission is preferably used. For example, illuminating devices with other planar light emission structures can be employed such as a configuration using electroluminescence (EL) type sheet or a liquid crystal panel. The light source of the light guide plate 3a is not limited to the LED, either, but an EEEL (external electrode fluorescent tube), CCEL (cathode tube), HCFL (hot cathode tube) and the like can be used.

Figure 6:
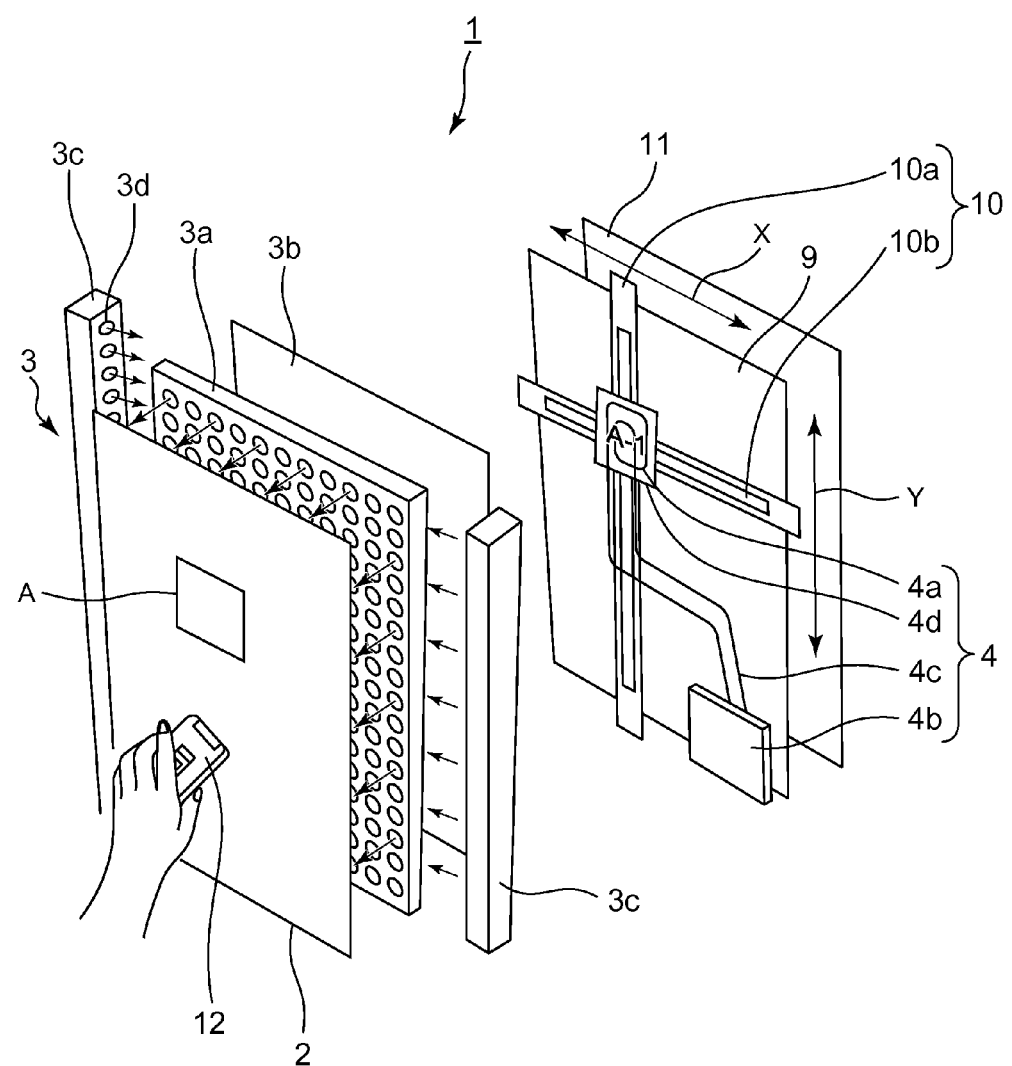
FIG. 6 is an appearance perspective view of an essential part of an electronic signboard shown in an exploded manner according to the second embodiment.
Figure 7:
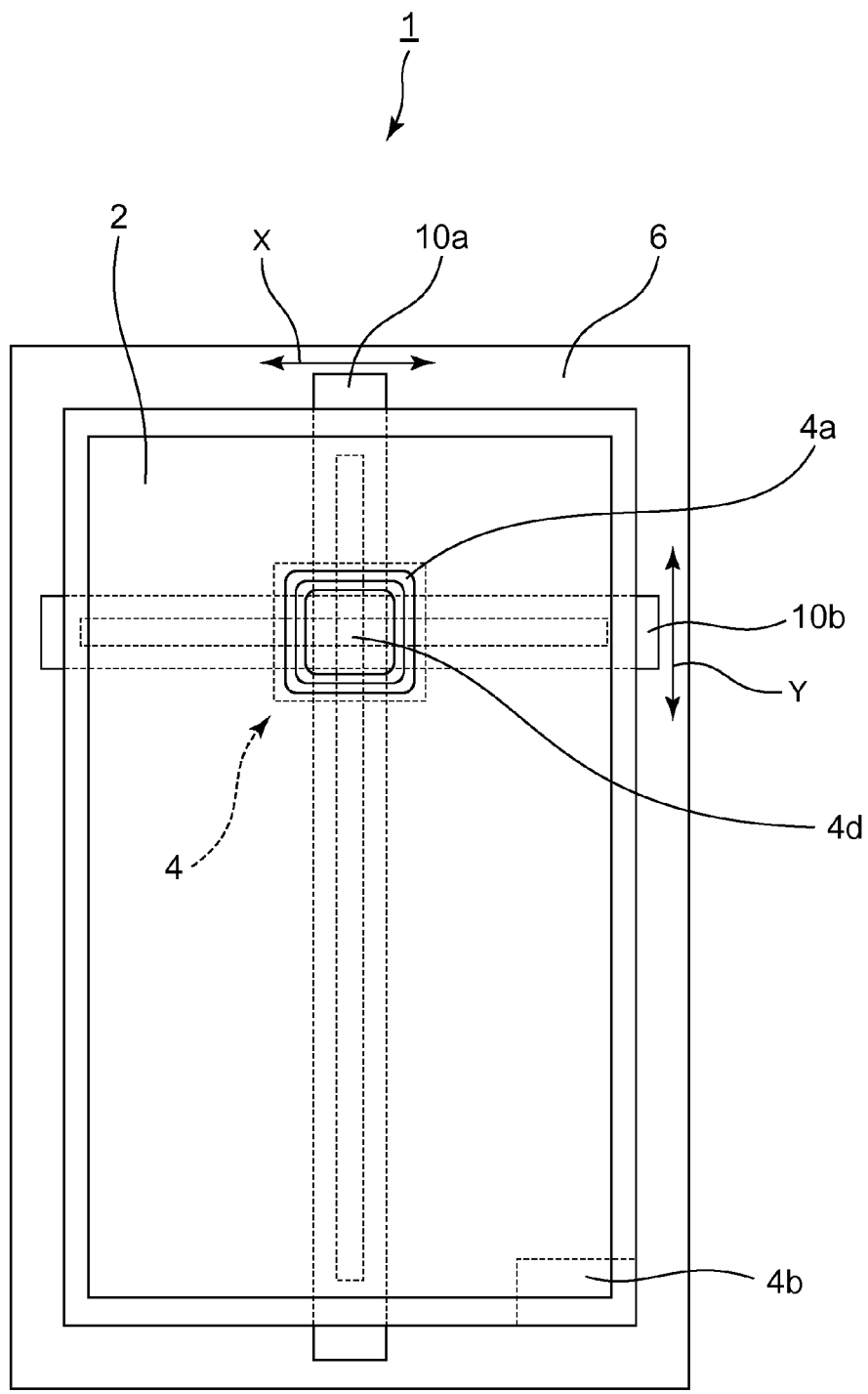
FIG. 7 is a rear view of the second embodiment.

Subsequently, the electronic signboard 1 according to the second embodiment of the present invention will be described referring to FIGS. 6 and 7. The same reference numerals are given to equal members or equal portions as those in the first embodiment and the first and second variations and the detailed description will be omitted. FIG. 6 is an appearance assembly diagram illustrating a configuration of an essential part of the electronic signboard 1 according to the second embodiment in a perspective view, and FIG. 7 is an appearance view illustrating the back face of the electronic signboard 1.

A difference in configuration between the second embodiment and the first embodiment is that, in the back face of the illuminating device 3 (back face of the light guide plate 3b), the antenna portion 4a of the reader/writer 4 is configured to be able to be guided by a guide 10 and moved.

The reader/writer 4 has a structure separated into the antenna portion 4a and the control portion 4b and they are connected by the lead wire 4c to each other. The antenna portion 4a is configured to be able to be moved along the front face of a supporting panel 9 arranged in parallel with a predetermined gap on the back face of the light guide plate 3b, that is, on the back face of the light guide plate 3b.

In more specific description, on the front face of the supporting panel 9, a guide 10 consisting of elongated plate-shaped X-axis guide 10a and Y-axis guide 10b crossing each other at a right angle are arranged, and the antenna portion 4a is bonded or attached with an appropriate fastener to the antenna board 4d mounted at a portion where the both guides 10a and 10b cross each other. On the back face of the antenna board 4d, a motor, not shown, is equipped so that a driving torque of the motor is transmitted to a screwing mechanism, a winding link mechanism formed by a cord-like member and the like, not shown, disposed along the X-axis guide 10a and the Y-axis guide 10b.

In this way, the above driving means formed by the motor, the winding link mechanism and the like is controlled by the control portion 4b, and when the driving means is driven, the antenna portion 4a is moved vertically and horizontally, and by means of stop of the driving means, the antenna portion 4a is positioned and fixed at a predetermined position.

Reference numeral 11 denotes a back face plate forming a panel bottom plate arranged on the back face of the supporting panel 9 and protects the electronic signboard 1 from intrusion of foreign substances from outside. Also, reference numeral 12 denotes a portable information terminal.

According to the second embodiment, the driving means is operated by a command signal from the control portion 4b, the guide 10 is moved in the X-axis or Y-axis direction along the plane of the supporting panel 9, that is, in the vertical or horizontal direction, and the antenna portion 4b can be moved to an optimal position corresponding to the access point A set on the advertizing medium 2 to be newly replaced. As a result, by holding the portable information terminal 12 over the access point A, communication is conducted with the reader/writer 4 via the antenna portion 4a in a non-contact manner, and a user can access a site having predetermined digital contents and the like and use various services.

In this second embodiment, the reader/writer 4 is in a mode in which the antenna portion 4a and the control portion 4b are separated from each other, but in a mode in which the both 4a and 4b are integrated, they may be mounted on the antenna board 4d.

Also, in the second embodiment, a single set of the guide 10 is provided in the configuration, but a plurality of the guides may be provided and the reader/writer or the antenna portions may be provided at crossing portions of each guide according to that. According to this configuration, even in the mode in which the plurality of reader/writers or antenna portions are mounted, by providing the guides in plural, each reader/writer or antenna portion can be moved to an optimal access point, and advertizing effects can be improved.

Also, the guide 10 is provided on the supporting panel 9 side, but instead, it may be provided on the reflective plate 3b. In this case, in order to prevent trouble in the communication, consideration should be given so that plate thicknesses of the light guide plate 3a and the reflective plate 3b are made as small as possible, and also, the antenna portion needs to be arranged at a position the closest to the reflective plate 3b.

Also, the X-axis guide 10a and the Y-axis guide 10b are formed by plate-shaped members, but instead, the guide 10 can be configured using a non-stretching resin material such as nylon formed in a thread or screw mode. In the case of such configuration, interference caused by facing of a radio wave emitted from the reader/writer, in other words, mutual influence between a signal which is a radio wave transmitted from the reader/writer 4 directly reaching the RFID tag and a signal which is the radio wave transmitted from the reader/writer is reflected around the gap in the panel frame 6 and reaching the RFID tag can be suppressed and moreover, an inside space of the electronic signboard 1 can be widened.

In the second embodiment, the case in which the antenna portion 4a can be moved automatically by the driving means was shown, but it is naturally possible to manually move it. In this case, too, only by operation the guide 10 (the X-axis guide 10a and the Y-axis guide 10b) from outside the electronic signboard 1, the position of the antenna of the reader/writer 4 can be moved. Also, in this embodiment, the light guide plate 3a is irradiated in the edge light type, but it may be the mode using the sheet material in the EL method.

A third embodiment will be described referring to FIGS. 8 and 9. The characteristic of the third embodiment is to provide a magnetic sheet 13 and that transmission/reception performances of a radio wave or an electromagnetic wave can be stabilized not depending on an installation environment of the electronic signboard 1.

Figure 8:
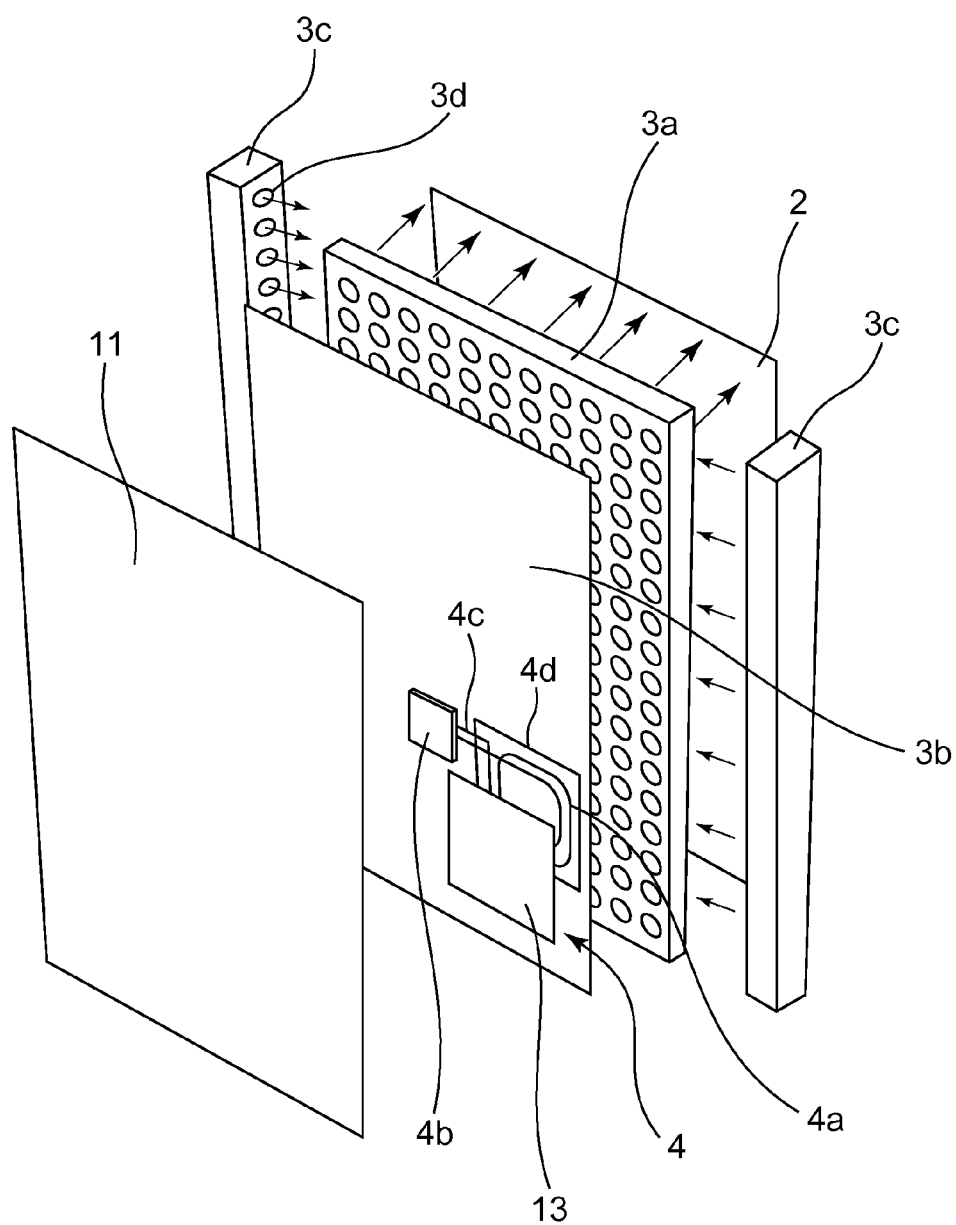
FIG. 8 is an appearance perspective view of an essential part of an electronic signboard shown in an exploded manner according to a third embodiment.

FIG. 8 is an appearance perspective view illustrating the electronic signboard 1 according to the third embodiment in an exploded manner, and its basic form has a configuration of the LED edge light type. That is, the electronic signboard 1 of the third embodiment has a structure in which the reader/writer 4 is arranged on the back face of the reflective plate 3b, and the back face of the reader/writer 4 is covered by a back face plate 11.

Figure 9:
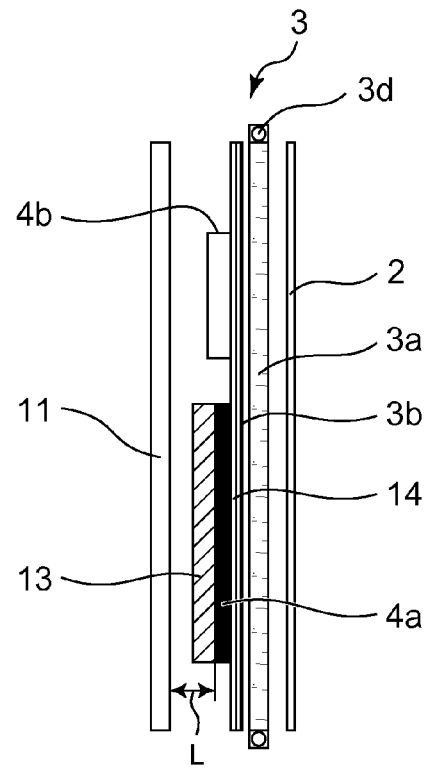
FIG. 9 is a side view of the electronic signboard shown in FIG. 8.

If a distance between the illuminating device 3 and the back face plate 11 or more specifically a distance L between the antenna portion 4 and the back face plate 11 is within 3 mm, as shown in FIG. 9, the antenna portion 4a having a coil-shaped antenna coil is sandwiched between a conductive layer portion 14 made of a metal plate or the like and the magnetic sheet 13 so as to form a laminate structure. The control portion 4b is, as shown in FIG. 9, disposed on the reflective plate 3b side, but it is needless to say that it may be attached to the back face plate 11. The magnetic sheet 13 is obtained by filling a ferrite magnetic powder or a metal magnetic powder in a base material made of a synthetic resin and forming it into the sheet shape. The material does not particularly matter as long as the mode has a function of a magnetic absorbing body.

According to the third embodiment, by having a laminate structure in which the antenna portion 4a is sandwiched between the conductive layer portion 14 and the magnetic sheet 13, an influence on the metal around a spot where the electronic signboard 1 is installed can be eliminated. However, if the conductive layer portion 14 is provided, the conductive layer portion 14 consumes the radio wave and the electromagnetic wave as an eddy current, and receiving sensitivity is deteriorated by the portion. However, since the magnetic sheet 13 is present on the back face side of the antenna portion 4a and the antenna portion 4a is sandwiched between the conductive layer portion 14 and the magnetic sheet 13, the receiving sensitivity of the portable information terminal with the RFID tag of 13.56 MHz can be improved.

Figure 10:
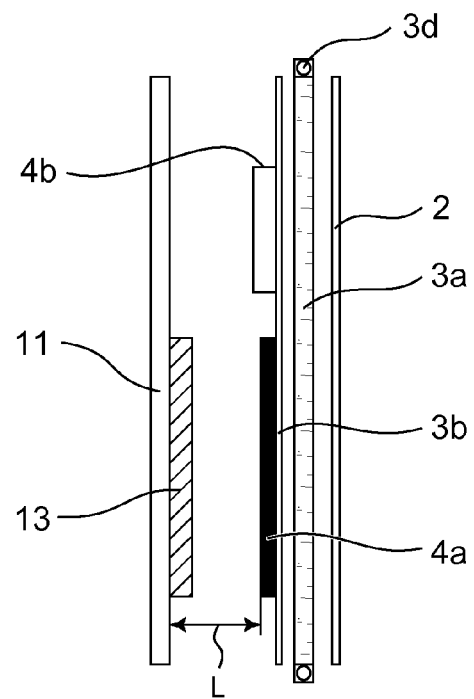
FIG. 10 is a side view of the electronic signboard similar to FIG. 9 in a variation of the third embodiment.

If the distance L is 3 mm or more, a configuration of a variation shown in FIG. 10 can be employed. That is, the antenna portion 4a is attached on the back face of the reflective plate 3b as the illuminating device 3, and the magnetic sheet 13 is arranged on the back face plate 11 opposing the antenna portion 4a. By means of this variation, too, drop in the antenna output of the antenna portion 4a can be avoided.

In the third embodiment and its variations, the electronic signboard of the LED edge light type was described, but it is needless to say that an electronic signboard may be in a mode in which the light guide plate 3a is replaced by a liquid crystal panel. In this case, the distance L between the antenna portion 4a and the back face plate 11 is preferably held at 3 mm or more.

Figure 11:
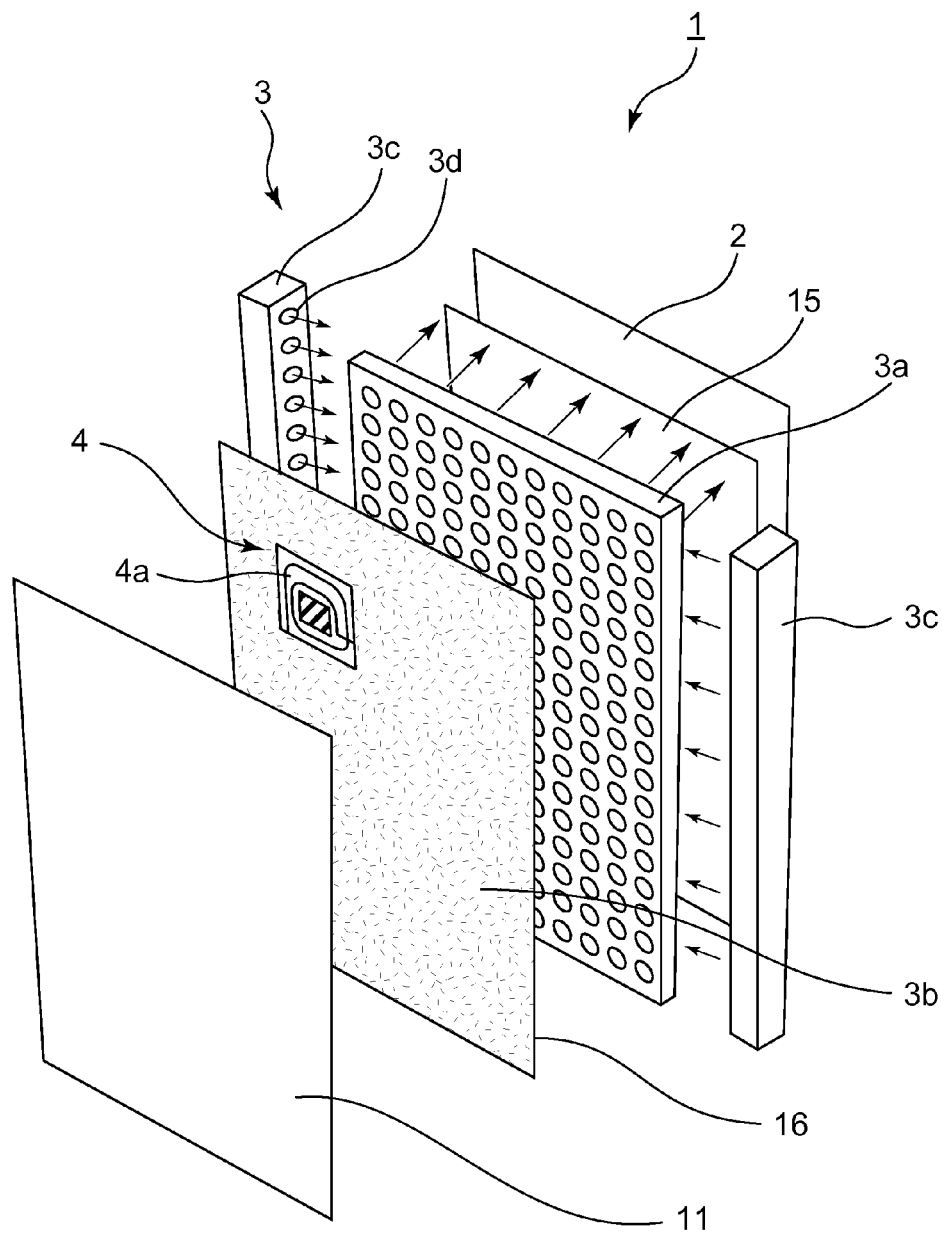
FIG. 11 is an appearance perspective view of an essential part of an electronic signboard shown in an exploded manner according to a fourth embodiment.

Subsequently, a fourth embodiment shown in FIG. 11 will be described. The electronic signboard 1 according to the fourth embodiment is substantially the same as the basic form of the electronic signboard 1 in each of the above embodiments, and the detailed description will be omitted. The fourth embodiment is characterized in that the reader/writer 4 is detachably attached.

The illuminating device 3 has a structure in which a scattering plate 15 is provided on the front face of the light guide plate 3a. The scattering plate 15 efficiently scatters light of the light guide plate 3a on the back face of the advertising medium 2. As a result, the illuminating means 3 can irradiate the advertising medium 2 with uniform backlight.

On the front face of the reader/writer 4, a planar fastener for connection (Velcro fastener) is attached. On the other hand, on the light reflective plate 3b on the back face side of the light guide plate 3a, a planar fastener for connection (Velcro fastener) 16 is attached. By the both planar fasteners, the reader/writer 4 can be detachably attached to the reflective plate 3b. As a result, the reader/writer 4 can be attached by the planar fasters at an arbitrary position to the light reflective plate 3b.

According to the fourth embodiment, if the advertising medium 2 is to be replaced by another new advertising medium, the reader/writer 4 is removed, and the removed reader/writer can be easily attached to an access point of the new advertising medium set at a position different from before. In this way, since the position of the antenna portion 4a in the reader/writer 4 can be attached with fine adjustment according to the access point, a situation of communication failure can be prevented. Also, an advertisement producer can produce an advertisement medium with excellent designability in which an access point is provided at an arbitrary position.

In the fourth embodiment, the planar fastener 16 is provided on the light reflective plate 3b side, but it is also possible to provide the planar faster on the back face plate 11 side. With the above configuration, the reader/writer 4 can be detachably attached with the planar fastener on the back face plate 11.

Also, in the fourth embodiment, the electronic signboard 1 having an LED edge-light type illuminating device is employed, but instead, an electronic signboard in a mode in which an EL type sheet is provided can also be used.

Subsequently, a fifth embodiment will be described referring to FIG. 12. This fifth embodiment is characterized in that when the advertising medium, that is, a poster is to be replaced (switched), a URL (linked URL) of a site carrying old contents stored in a plurality of reader/writers can be updated to an URL (linked URL) of a site carrying new contents in a lump sum. In the following an example in which data is applied to the URL will be described, but it is needless to say that the update data is not limited to the URL.

In the electronic signboard 1, eight antenna portions 4a, for example, are disposed on the back face of the illuminating device 3, and each antenna portion 4a is connected to the single control portion 4b through a lead wire.

On the other hand, on a poster 2, access points A are provided by printing at eight spots corresponding to the antenna portions 4a, and in an area or in the vicinity of any one of the access points A, an IC tag 17 exclusively for linked destination switching is buried as shown by hatching. This IC tag 17 is in a form in which a memory (IC chip) for mainly storing data and an antenna coil for picking up a radio wave (radio) are integrated. In the memory, new URL information corresponding to the antenna portions 4a at eight spots of the reader/writer is stored in advance. Also, unless information is called up through a protocol (rule) exclusively for URL information update, the URL information is configured not to be transmitted to the outside.

Figure 12:
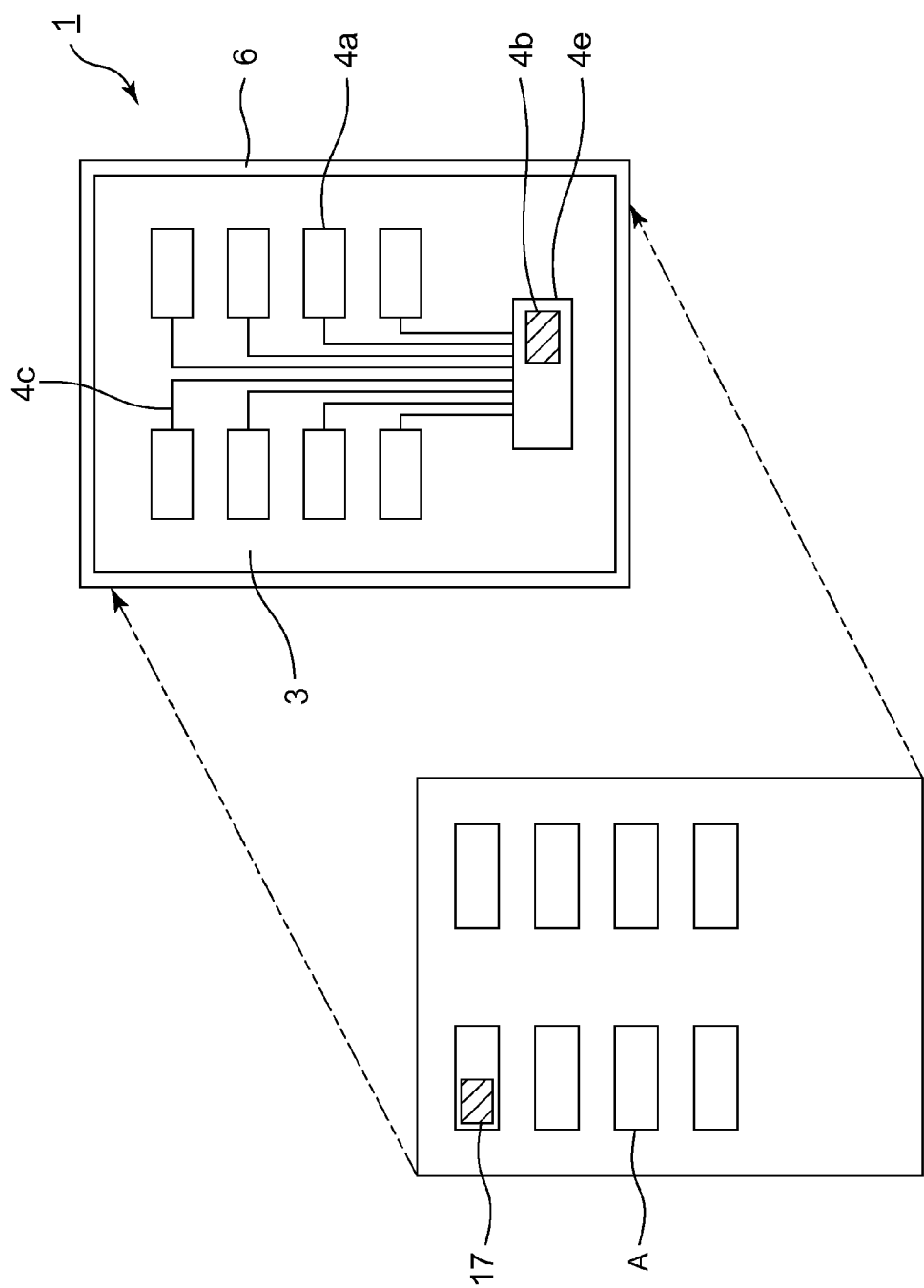
FIG. 12 is an appearance diagram schematically illustrating an electronic signboard according to a fifth embodiment.

According to the fifth embodiment, as shown by a two-dot chain line in FIG. 12, when a new poster 2 is posted, the antenna coil on the IC tag 17 side is automatically held over the antenna portion 4a arranged opposing that. The control portion 4b has an information update portion, not particularly shown, and regularly performs a polling work by the protocol exclusively for information update using the antenna portion 4a. As a result, the information update portion in the control portion 4b can obtain the new URL information stored in the IC tag 17 using the antenna portion 4a, and the new URL (linked URL) in all the antenna portions 4a or arbitrary antenna portions 4a can be updated in a lump sum.

In the fifth embodiment, the mode in which the IC tag 17 is buried in the poster, that is, the mode in which the IC tag 17 is integrated with the poster was described, but instead, a portable IC tag device (an IC card or a portable terminal incorporating an IC tag, for example) attached with the IC tag 17 can be also used. According to such a variation, only by grasping the IC tag device by a poster switching worker and holding it over any one of the antenna portions 4a from above the newly replaced poster, all of or arbitrary URL information (linked URL) can be rewritten. As a result, the advertising medium can be manufactured inexpensively.

Subsequently, a sixth embodiment will be described. The sixth embodiment is characterized in that transmission/reception of a radio wave with the electronic signboard 1 in each of the embodiments and the like is made reliable without any malfunction and has a billing system in which contents such as music, games, videos and the like needed by a user can be obtained safely and reliably. An example in which the present invention is applied to a portable information terminal will be described below and it can be also applied to an IC card and the like.

Figure 13:
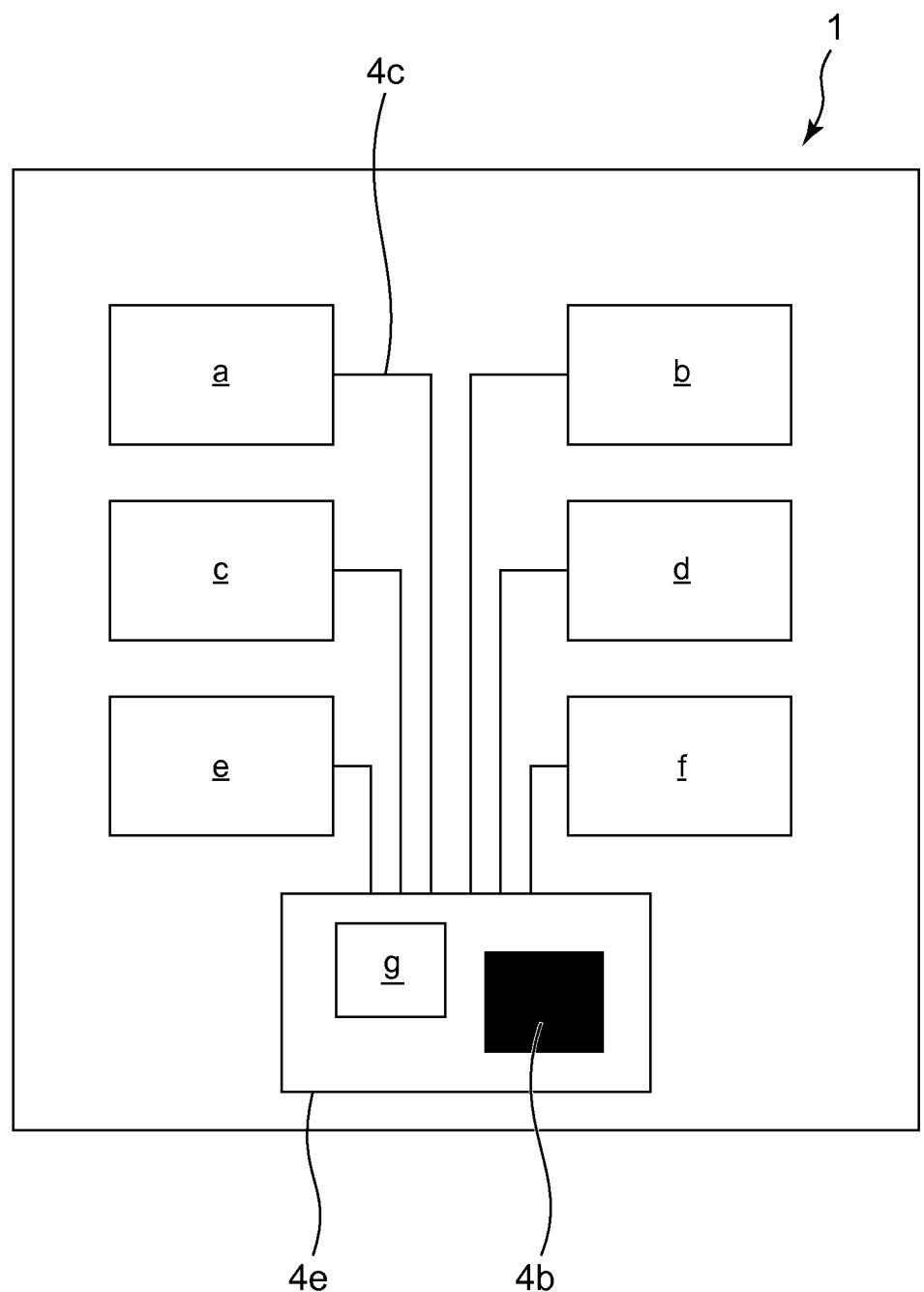
FIG. 13 is an appearance diagram schematically illustrating an electronic signboard according to a sixth embodiment.

As shown in FIG. 13, the electronic signboard 1 in the sixth embodiment has substantially the same basic form as the basic form of the electronic signboard 1 shown FIGS. 4 and 12. That is, six (the number is not limited to this) antenna portions a to f are mounted on the antenna board, and each of the antenna portions a to f is connected to the control portion 4b having a memory portion made up by an MPU on the main board 4e or the like through the lead wire 4c, and six reader/writers are formed.

By holding the portable information terminal or the like over any one of the antenna portions a to f, an ID for purchase relating to the contents to be purchased by a user is transferred and given from the control portion 4b, which will be described later, to the portable information terminal. Also, each reader/writer formed in each of the antenna portions a to f performs polling in a steady manner by the control portion 4e, which will be described later.

On the main board 4e, an antenna portion g for purchase confirmation connected to the control portion 4e is mounted. The antenna portion g for purchase confirmation does not perform the polling work usually. When the portable information terminal or the like is held over each of the other antenna portions a to f for communication, the antenna portion g for purchase confirmation starts polling for the first time. This control is executed by the control portion 4b.

The configuration of the control portion 4b will be described in more detail. In the following, the antenna portions a to f and the antenna portion g exclusively for purchase confirmation are referred to as reader/writers a to f and a reader/writer g for purchase confirmation for convenience of explanation.

Figure 14:
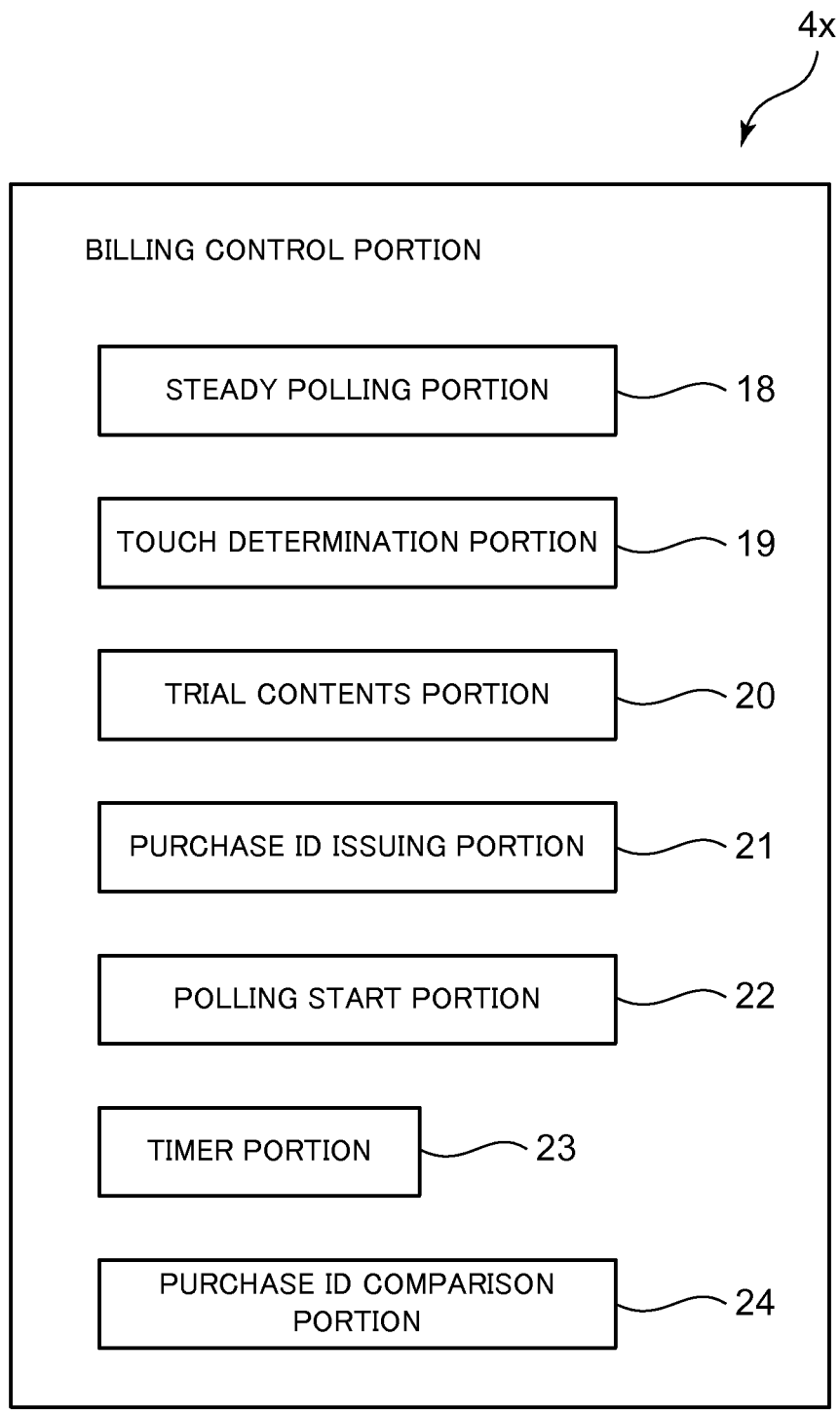
FIG. 14 is a configuration diagram illustrating a configuration of a control portion in FIG. 13.

The control portion 4b has a billing control portion 4x as shown in FIG. 14 in addition to the MPU (or CPU), not shown, and a storage portion. This billing control portion 4x is configured by a steady polling portion 18, a touch determination portion 19, a contents trial portion 20, a purchase ID issuing portion 21, a polling start portion 22, a timer portion 23, and a purchase ID comparison portion 24.

The steady polling portion 18 has the reader/writers a to f (however, excluding the reader/writer g for purchase confirmation) perform polling in a steady manner. At this time, the polling portion executes control so that the adjacent reader/writers do not perform polling at the same time. The touch determination portion 19 detects if the portable information terminal is held over the reader/writers a to f or not. The contents trial portion 20 transmits URL information to download trial contents to use music or a game on a trial basis, for example, to the portable information terminal when the portable information terminal is touched on the access point. A user connects to a public communication line based on the obtained URL information and downloads the trial contents. If an information amount is small, contents can be directly transmitted from the reader/writers a to f to the portable information terminal.

The purchase ID issuing portion 21 transmits an ID for contents purchase (purchase ID) to the portable information terminal side when the portable information terminal is held over (touched on) the reader/writers a to f. The purchase ID is stored in the storage portion of the control portion 4b or stored in the reader/writer g for purchase confirmation.

The polling start portion 22 starts polling of the reader/writer g for purchase confirmation when the portable information terminal is held over the reader/writers a to f. That is, the state moves on to a purchase available state. The timer portion 23 monitors a polling time of the reader/writer g for purchase confirmation by the polling start portion 22 so that the reader/writer g for purchase confirmation can perform polling only for a preset time. The purchase ID comparison portion 24 obtains a purchase ID from the portable information terminal when the portable information terminal is held over the reader/writer g for purchase conformation, compares the purchase ID and the purchase ID stored in the control portion 4b and permits billing of a contents purchase when they are matched and also transmits the URL information to download the authorized contents to the portable information terminal at the same time.

A predetermined time during which the timer portion 23 operates the polling start portion 22 is preferably about 5 minutes, for example, but it is possible to change the time as appropriate according to the contents for trial use. In addition, it is also preferably configured such that the timer is turned off immediately once the portable information terminal is held over the reader/writer g for purchase confirmation.

Figure 15:
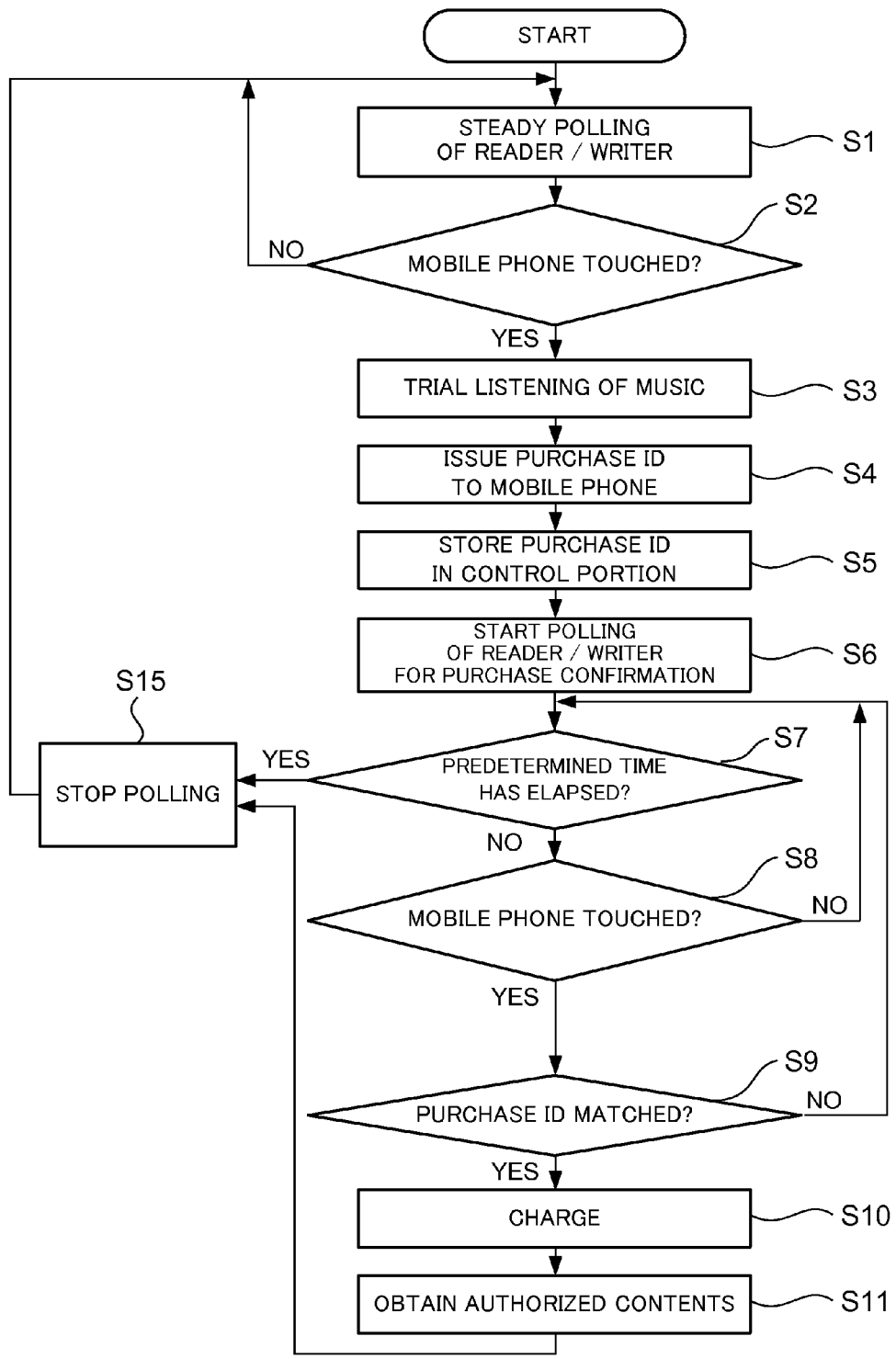
FIG. 15 is a flowchart of billing.

An operation of the sixth embodiment will be described on the basis of a billing flow chart shown in FIG. 15.

The electronic signboard 1 is connected to a main power supply, and at Step 1 (hereinafter the step is referred to as "S"), the steady polling portion 18 sequentially polls the reader/writers a to f. If the user holds the portable information terminal over the access point in order to purchase music contents, whether or not the portable information terminal was held over is determined by the touch determination portion 19 (S2). If it is determined that the terminal is touched, the routine goes to Step 3 and the touch determination portion 19 transmits URL information from which the contents for trial listening of music can be downloaded to the portable information terminal (S3). At the same time, the purchase ID issuing portion 21 transmits a purchase ID for purchasing the music to the portable information terminal (S4) and moreover, stores the purchase ID in the control portion 4b (S5).

If the purchase ID is transferred to the control portion 4b, the polling of the reader/writer g for purchase confirmation is started by the polling start portion 22 (S6). In the timer portion 23, the polling time of the reader/writer g for purchase confirmation is counted, and it is determined if a predetermined time has elapsed or not (S7). If the predetermined time has elapsed since the polling of the reader/writer g for purchase confirmation was started, the polling of the reader/writer g for purchase confirmation is finished (S15), and the routine returns to the beginning. On the other hand, if the predetermined time has not elapsed, the touch determination portion 19 determines if the portable information terminal has touched the reader/writer g for purchase confirmation or not (S8). If not touched, the routine returns to S7, and determination on whether or not the polling has been made for the predetermined time is repeated. At S8, if the portable information terminal is held over the reader/writer g for purchase confirmation, the purchase ID comparison portion 24 compares and determines if the ID issued to the portable information terminal matches the ID stored in the control portion 4b or not (S9). If it is determined that the purchase ID does not match at S9, it is determined that the portable information terminal of another person other than the purchaser is touched by accident, the routine returns to S7, and determination is made on whether or not the polling has been made for the predetermined time. As a result, billing on another person by accident can be avoided.

If the purchase ID matches (S9), it is authorized that the user has an intention to purchase the contents, the billing data is directly transmitted to the user at the portable information terminal and the user is charged (S10). At the same time, the URL to download the authorized contents is transmitted to the portable information terminal (S11). After that, the polling of the reader/writer g for purchase confirmation is forcedly finished (S15), and the initial steady state is recovered (S1).

As mentioned above, according to the sixth embodiment, by utilizing the ID tag of the portable information terminal of the user, the reliable electronic signboard 1 provided with a safe and reliable authorization billing system in which whether or not the purchase ID matches can be compared and determined can be obtained. Also, by using a plurality of reader/writers (antennas), desired goods can be selected from a large number of goods, and a simple and highly convenient electronic signboard can be obtained.

Subsequently, a seventh embodiment of the embodiment will be described referring to FIGS. 16 and 17. Here, a case in which the information display panel of the present invention is applied to a guidance sign 101 will be shown. Since a basic configuration of the guidance sign 101 is similar to the electronic signboard 1 shown in the first to sixth embodiments, only different portions will be mainly described here, and duplicated explanation will be omitted.

Figure 16:
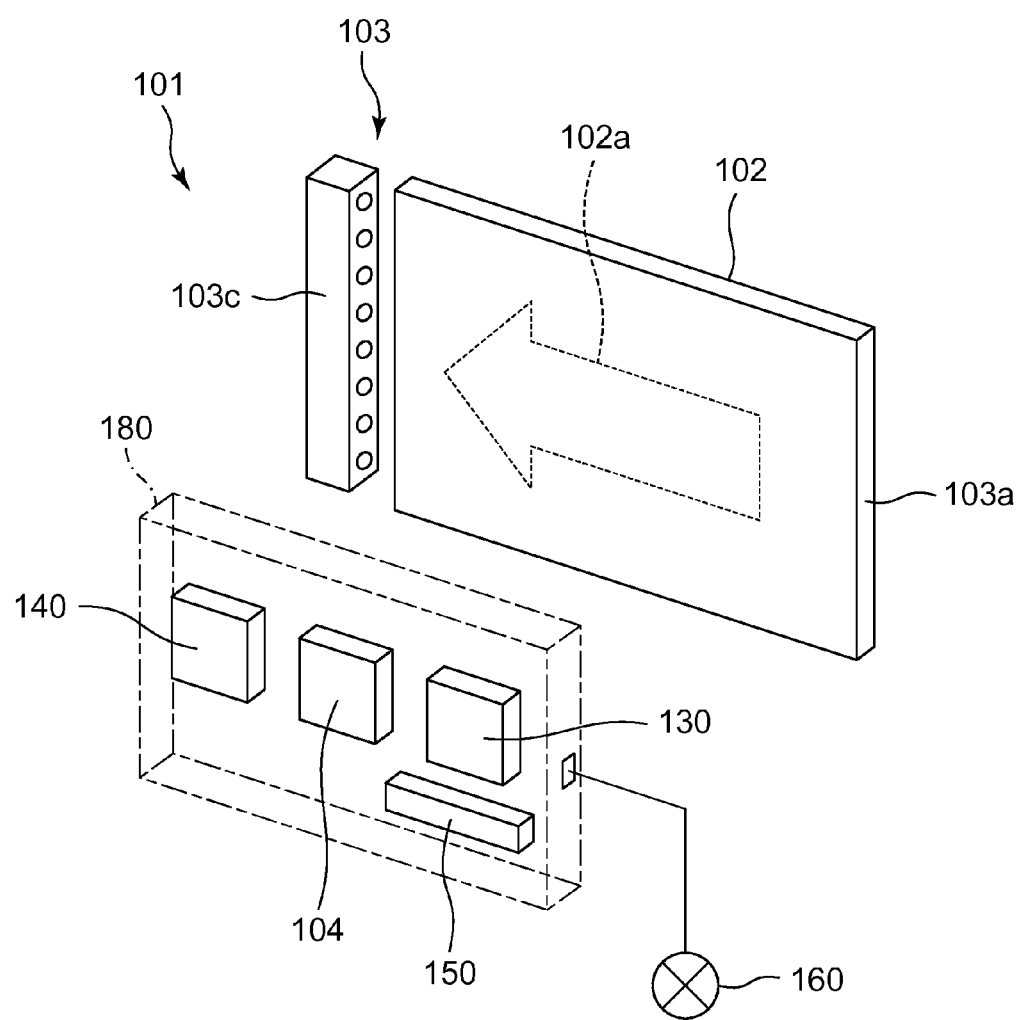
FIG. 16 is an appearance diagram schematically illustrating a guide according to a seventh embodiment.

The guidance sign 101 is, as shown in FIG. 16, provided with a guidance display face 102, an illuminating device 103 of a planar light emission type integrally provided with the guidance display face, and a communication box 180 attached on the back face of the illuminating device 103. The illuminating device 103 is configured by a light transmissive light guide plate 103a and a light source unit 103c arranged along an edge of the light guide plate 103a. Here, on the surface of the light guide plate 103a, the guidance display face 102 is formed. On the guidance display face 102, an arrow mark 102a indicating an evacuation direction is displayed by printing or projections and recesses.

The communication box 180 is provided with a reader/writer 104, a communication area supplying device 130, a WEB server device 140, and a battery 150, and they are connected to each other by wiring, not particularly shown. The reader/writer communicates with an IC tag when the portable information terminal incorporating the IC tag is held over the arrow mark 102a and transmits URL information to obtain an evaluation path to the portable information terminal. An access destination of the URL information is set at the WEB server device 140.

The communication area supplying device 130 is provided with a radio communication antenna and connected to a public communication line network 160 such as a telephone network, the Internet and the like for supplying a radio communication area. This communication area is not particularly limited but includes femtocell having a extremely small area of communication with a radium of approximately several tens meters, for example. Even so-called outside the communication of a mobile phone, the portable information terminal is capable of communication/call owing to presence of the communication area supplying device 130. The communication area supplying device 130 is also connected to the WEB server device 140. Therefore, the portable information terminal can download necessary information by connecting to the WEB server device 140 through the communication area supplying device 130.

The WEB server device 140 functions as a WWW server, which receives an access from the outside and delivers information. Moreover, the WEB server device 140 also has a DNS server function. Even if the public communication line network 160 is disconnected by an earthquake disaster, outage and the like, when the portable information terminal makes a request of an access to a specific URL through the communication area supplying device 130, the access destination of the URL (domain name) is solved by the DNS server function. As a result, the portable information terminal can access the WWW server function of the WEB server device 140. Also, in the WEB server device 140, evacuation path information, emergency contact information and the like are stored and can be delivered upon request from the portable information terminal.

The battery 150 functions as a so-called uninterruptible power supply (UPS) and supplies power to the illuminating device 103, the reader/writer 104, the communication area supplying device 130, and the WEB server device 140 even during outage.

Figure 17:
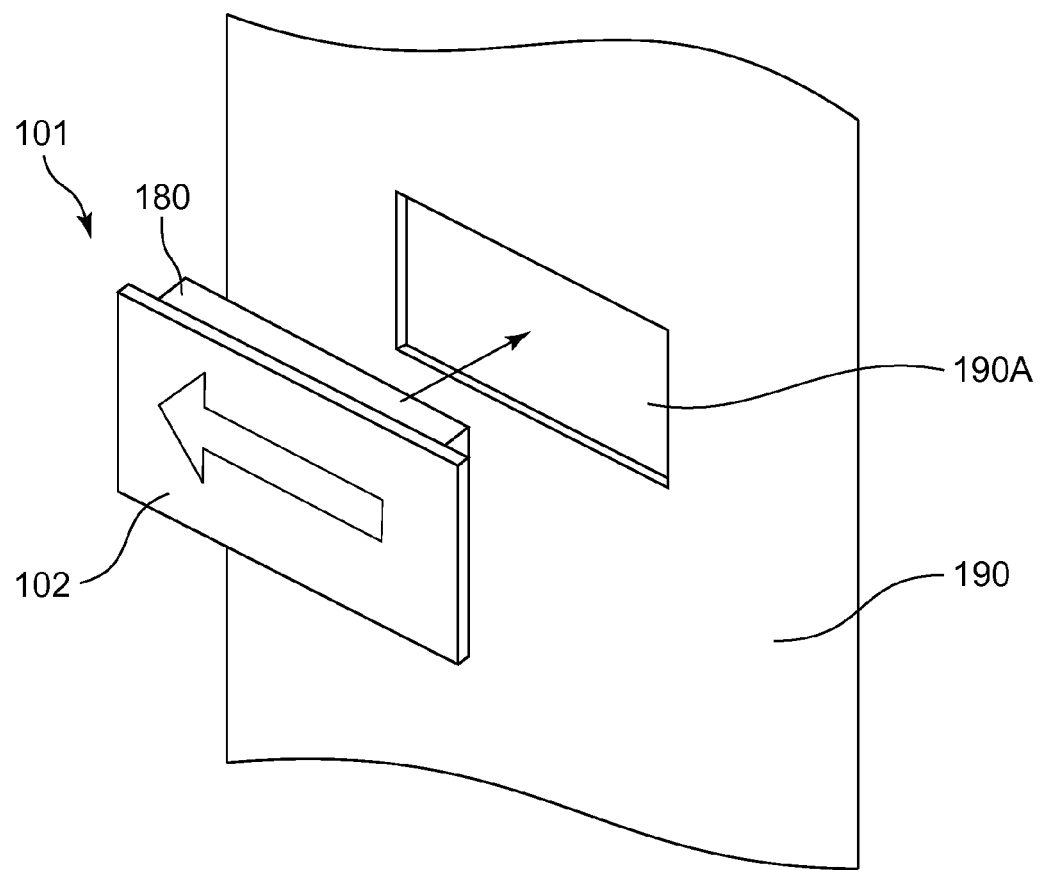
FIG. 17 is an appearance diagram illustrating an installation mode of the guide.
Figure 18:
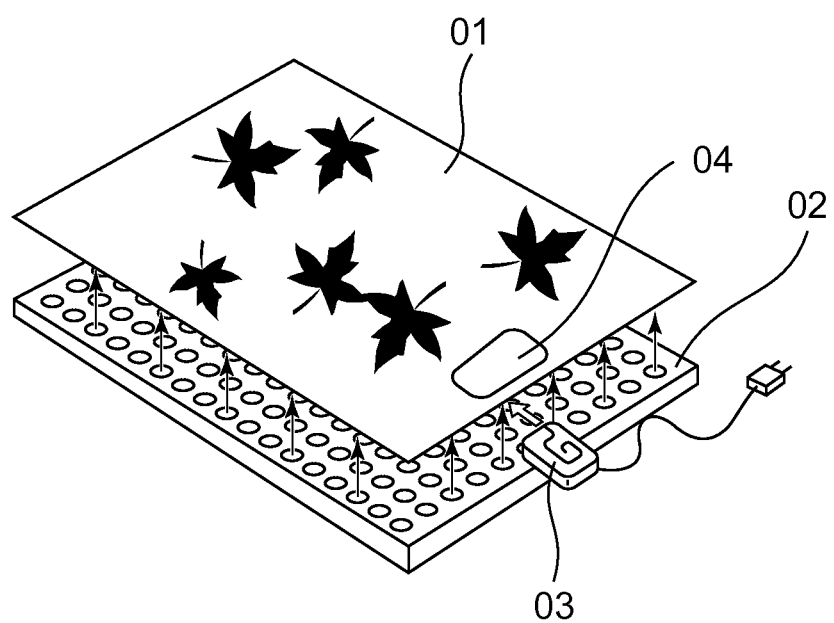
FIG. 18 is an outline configuration diagram of an information display panel in an examination process by the inventors.

The guidance sign 101 is, as shown in FIG. 17, inserted into a mounting hole 190A formed in a wall surface 190. After the insertion, only by connecting the power supply and the public communication line to the guidance sign 101, it can be installed easily.

According to this guidance sign 101, in a steady time, the sign functions as a guidance sign for presenting an evacuation path. At the same time, by the communication area supplying device 130, a communication/call area for the portable information terminal can be offered even in locations which can be outside a communication area easily such as subways, higher floors in high-rise buildings and the like. Therefore, in the case of a disaster, by getting close to the guidance sign 101, communication can be made with the outside using the portable information terminal. Moreover, by touching the portable information terminal on the guidance sign 101, the URL information to access the WEB server device 140 is supplied from the reader/writer 104. On the basis of the URL information, by accessing the WEB server device 140 through the communication area supplying device 130, evacuation paths, maps of the neighborhoods and the like can be obtained. These operations are all realized by devices in a closed space in the communication box 180, and even if the public communication line network 160 failed, information can be obtained reliably.

In the above embodiments, only the case in which the information display panel is used for the electronic signboard or a guidance sign is shown, but the present invention is not limited to each of the embodiments and each of the variations, but it is needless to say that various changes can be made in a range not departing from the gist of the present invention. Also, an installation form of the information display panel is not limited to the above embodiment, but it can be used in various forms including a floor of a shop, on the ground, wall surfaces of a shop, a station, and the like, for example. Also, in all of the above embodiments, only the structure in which the incorporated reader/writer is electrically operated using a power supply is shown, but the present invention is not limited to that, but in the case of an active tag in which a portable information terminal side incorporating an IC tag is electrically operated, the reader/writer side may be configured only by an RFID tag.

The information display panel of the present invention is capable of an interactive communication with an electronic signboard only by holding a non-contact information storage medium (hereinafter also referred to as an "RFID tag") incorporated in the portable information terminal or a card with a non-contact information storage medium (non-contact IC card) and the like over an access point where a reader/writer for RFID (Radio Frequency Identification) is provided and can be used in a safe, assured and reliable electronic signboard from which contents such as music, games, novels, movies and the like, area information such as accommodations of tourist spots, events, shopping, sports events and the like can be obtained instantaneously.

What is claimed is:

1. An information display panel comprising:
an illuminating device for illuminating an information medium from a back face thereof provided on the back face side of said information medium, said illuminating device is provided with a planar light emitting light source emitting light in a planar state to said information medium side of said illuminating device; and
a reader/writer corresponding to a non-contact information storage medium on the back face side of said illuminating device, wherein an illuminated area of said information medium by said illuminating device is larger than a whole front face of said reader/writer so that a shade of said reader/writer is not reflected on said illuminated area of said information medium and the light from said illuminating device is used for illuminating the front face of said information medium.

2. The information display panel according to claim 1, wherein
said illuminating device is provided with a light guide plate of an edge light type or a light emitting plate in an electroluminescence (EL) method arranged on the back face of said information medium; and
said information medium is brought into close contact with said illuminating device.

3. The information display panel according to claim 1, wherein
said non-contact information storage medium is an RFID tag and incorporated in a portable information terminal or a card.

4. The information display panel according to claim 1, wherein
a plurality of said reader/writers are attached to the back face of said illuminating device, corresponding to a plurality of different spots on said information medium.

5. The information display panel according to claim 4, wherein
a plurality of said reader/writers are formed such that an antenna portion and a control portion are separated, and the plurality of said reader/writers share a single unit of said control portion; and
a plurality of said antenna portions are attached to said plurality of different spots on said information medium.

6. The information display panel according to claim 1, wherein
said reader/writer is disposed movably in a planar direction on the back face side of said illuminating device.

7. The information display panel according to claim 1, wherein
on the back face side of said illuminating device, a guide for movably holding said reader/writer is provided; and
said reader/writer is positioned and fixed by moving on said guide.

8. The information display panel according to claim 7, wherein
said guide is movably disposed on the back face side of said illuminating device.

9. The information display panel according to claim 7, wherein
said guide is provided in plural, and said reader/writer is held by said guide, respectively.

10. The information display panel according to claim 7, wherein
said guide is provided with an X-axis guide moving in an X-axis direction and a Y-axis guide arranged orthogonally to said X-axis guide and moving in a Y-axis direction, and at an intersection portion of said X-axis guide and said Y-axis guide, said reader/writer is attached.

11. The information display panel according to claim 1, wherein
said reader/writer has a coil-shaped antenna coil for conducting radio communication with said non-contact information storage medium; and said antenna coil is sandwiched between a conductive layer portion made up of a metal plate or the like and a magnetic sheet.

12. The information display panel according to claim 1, wherein on the back face of said illuminating device, a back face plate is arranged with a distance of 3 mm or more; and on the back face of said illuminating device, said reader/writer is disposed, and at a portion opposing said reader/writer on said back face plate, the magnetic sheet is disposed.

13. The information display panel according to claim 1, wherein on the back face of said illuminating device and said reader/writer, planar fasteners for connection are provided, respectively; and by means of said planar faster for connection, said reader/writer is fixed on the back face of said illuminating device.

14. The information display panel according to claim 13, wherein said illuminating device is provided with an edge-light method light guide plate and a light reflection plate arranged on the back face side of said light guide plate; and a planar fastener for connection is provided on the back face side of said light reflection plate.

15. The information display panel according to claim 1, wherein a back face plate is arranged on the back face side of said illuminating device;

planar fasteners for connection are provided on said back face plate and said reader/writer, respectively; and by means of said planar faster for connection, said reader/writer is fixed on the front face of said back face plate.

16. The information display panel according to claim 1, further comprising an IC tag for information update in which update data to be transmitted from said reader/writer to said non-contact information storage medium is stored, wherein by holding said IC tag for information update over said reader/writer, said update data is read by said reader/writer.

17. The information display panel according to claim 16, wherein said IC tag for information update is provided in said information medium; and when said information medium is installed in said illuminating device, said update data is automatically read by said reader/writer installed at a position corresponding to said IC tag for information update.

18. The information display panel according to claim 16, wherein said reader/writer is provided with an information update portion for performing polling by a protocol exclusively for information update for communicating with said IC tag for information update.

19. The information display panel according to claim 1, further comprising a billing control portion having:

a touch determination portion for detecting whether or not said non-contact information storage medium was held over any of a plurality of said reader/writers;

a purchase ID issuing portion for transmitting a purchase ID for contents purchase to said non-contact information storage medium when said non-contact information storage medium is held over said reader/writer;

a polling start portion for starting polling said reader/writer for purchase confirmation when said non-contact information storage medium is held over said reader/writer;

a purchase ID comparison portion for obtaining said purchase ID from said non-contact information storage medium when said non-contact information storage medium is held over said reader/writer for purchase confirmation, determining if the ID was issued by said purchase ID issuing portion or not, and permitting billing on contents purchase.

20. The information display panel according to claim 19, wherein said billing control portion further comprises:

a steady polling portion for having a plurality of said reader/writers perform polling steadily;

a contents trial portion for transmitting obtainment information for obtaining trial contents to said non-contact information storage medium when said non-contact information storage medium is held over said reader/writer; and a timer portion for monitoring a polling time of said reader/writer for purchase confirmation by said polling start portion.

21. The information display panel according to claim 1, further comprising a communication area supplying device provided with a radio communication antenna and connected to a public communication line network such as a telephone line or the Internet, for supplying a communication area and a WEB server device connected to said communication area supplying device and receiving an access from the outside and delivering information, wherein on the basis of communication between a portable information terminal incorporating said non-contact information storage medium and said reader/writer, said portable information terminal can access said WEB server device through said communication area supplying device.

* * * * *